United States Patent [19]

Louthan

[11] Patent Number: 4,538,374

[45] Date of Patent: Sep. 3, 1985

[54] FISH LINE SINKER

[76] Inventor: Clissolde L. Louthan, 9024 NE. Oregon, Portland, Oreg. 97220

[21] Appl. No.: 554,890

[22] Filed: Nov. 25, 1983

[51] Int. Cl.³ ............................................. A01K 95/00
[52] U.S. Cl. .................................... 43/44.96; 43/44.97
[58] Field of Search .................. 43/44.97, 44.96, 43.13

[56] References Cited

U.S. PATENT DOCUMENTS

| 1,993,114 | 3/1935 | Rasmussen | 43/43.13 |
|---|---|---|---|
| 2,605,577 | 8/1952 | Waugler | 43/43.13 |
| 3,453,768 | 7/1969 | Feaster | 43/43.13 |
| 3,570,167 | 3/1971 | Smith | 43/43.13 |
| 3,613,290 | 10/1971 | Louthan | 43/43.13 |
| 3,813,809 | 6/1974 | Frotiee | 43/43.13 |

FOREIGN PATENT DOCUMENTS 3005623  8/1981  Fed. Rep. of Germany ..... 43/44.97

Primary Examiner—Nicholas P. Godici
Assistant Examiner—C. McKee
Attorney, Agent, or Firm—Eugene M. Eckelman

[57] ABSTRACT

A body portion has a buoyant area at one end and a weight at the other end. The weight has sufficient mass to cause the body portion to submerge and in its submerged position the arrangement of buoyant area and weight causes the body member to stand on end. The pole line is hooked to the buoyant end whereby when a pull is imparted to the body portion by the pole line, the body portion in its initial movement lifts off the bottom and does not snag. In one embodiment the device employs side wings which cause the sinker to rise at substantially a steep angle. In another embodiment, the body portion has a stabilizing fin to minimize wobbling.

3 Claims, 6 Drawing Figures

U.S. Patent  Sep. 3, 1985  4,538,374
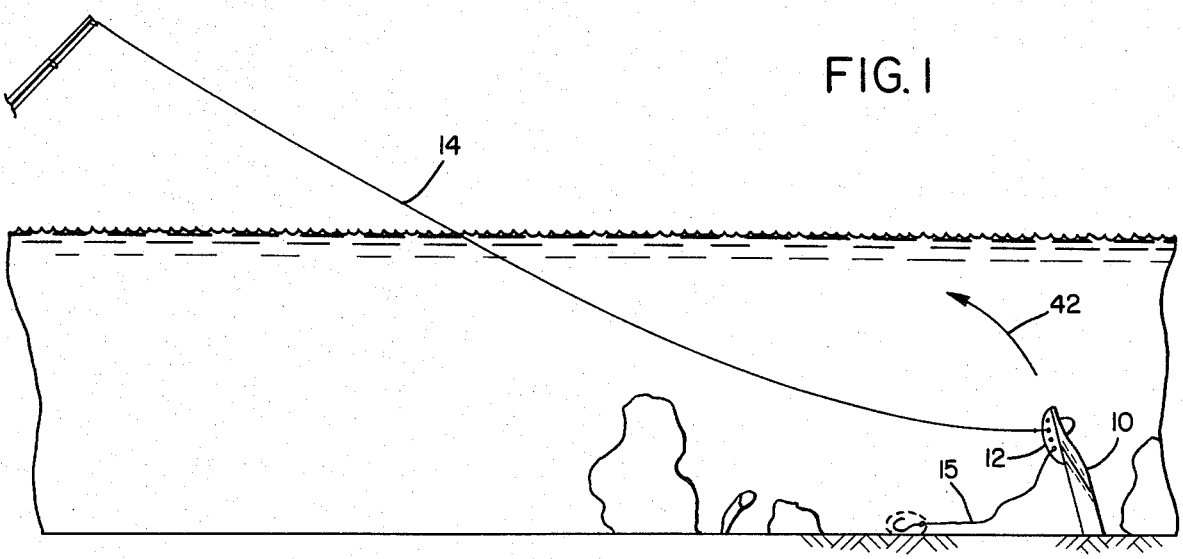
FIG. 1
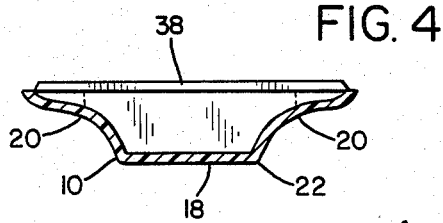
FIG. 4
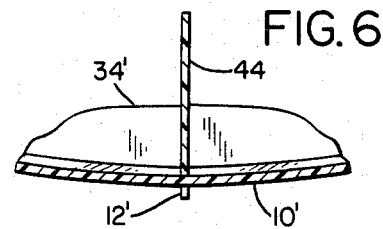
FIG. 6
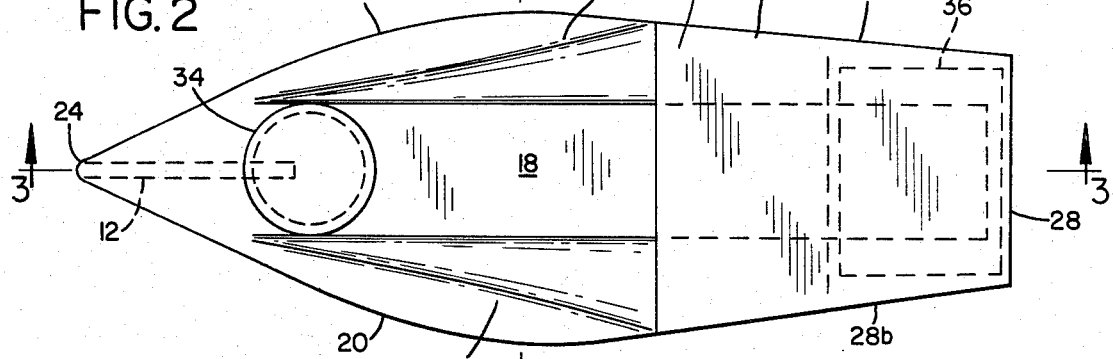
FIG. 2
FIG. 3
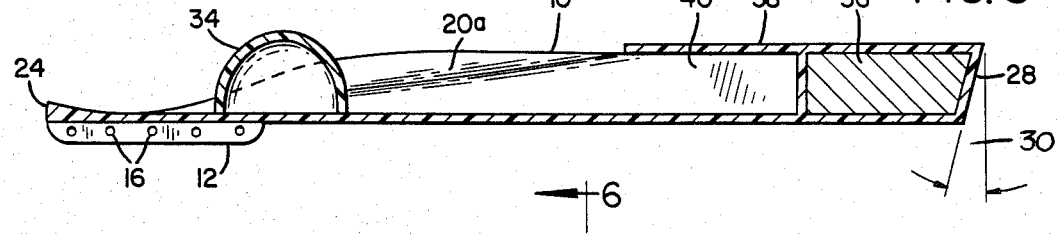
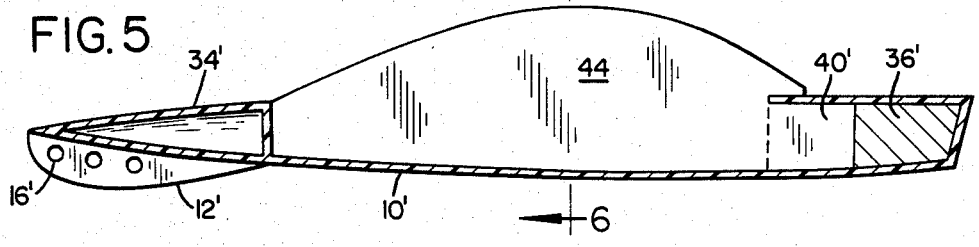
FIG. 5

FISH LINE SINKER

BACKGROUND OF THE INVENTION

This invention relates to new and useful improvements in fish line sinkers.

In some types of fishing, it is desired that a sinker at the end of the line sit on the bottom of the body of water or work along the bottom. Existing sinkers, such as lead sinkers, frequently hang up on rocks, twigs, logs or the like, and thus must be broken from the line. This of course requires the fisherman to stop fishing and apply new rigging. Also, this frequent change of rigging is costly.

SUMMARY OF THE INVENTION

According to the present invention and forming a primary objective thereof, a fish line sinker is provided having a novel shape and structure which serves effectively as a sinker and at the same time will not generally hang up on obstructions on the bottom of a body of water.

Another object is to provide a fish line sinker of the type described that employs a novel arrangement of weight and buoyant portions such that the sinker positions itself on the bottom of the body of water in upright position.

A further object is to provide a sinker of the type described which has a structural shape that causes it to lift almost straight up from the bottom of a body of water when pulled by the pole line, thus preventing snagging.

In carrying out the objectives of the invention, the sinker includes an elongated body portion with line connecting means and buoyant means at the forward end. The rearward end of the body portion has weight means therein of sufficient mass to submerge the body portion. With the weight at the rearward end and the buoyant means at the forward end, the body portion when submerged positions itself in upright relation on the bottom of the body of water whereby when a pull is imparted to it by the pole line, the body portion in its initial movement lifts up off the bottom to prevent snagging. In one embodiment, the body portion has side wing extensions which curve outwardly and upwardly to cause the body portion in its initial movement to travel upwardly at a steep angle. In another embodiment, the sinker has a stabilizing vane to minimize wobbling in the water.

The invention will be better understood and additional objects and advantages will become apparent from the following description taken in connection with the accompanying drawings.

BRIEF DESCRIPTION OF THE DRAWINGS

FIG. 1 is a view of a first form of fish line sinker of the invention in a working condition in a body of water;

FIG. 2 is a top plan view of the sinker;

FIG. 3 is a longitudinal sectional view taken on the line 3—3 of FIG. 2;

FIG. 4 is a cross sectional view taken on the line 4—4 of FIG. 3;

FIG. 5 is a longitudinal sectional view similar to FIG. 3 but showing a modified form of the invention; and FIG. 6 is a cross sectional view taken on the line 6—6 of FIG. 5.

DETAILED DESCRIPTION OF PREFERRED EMBODIMENTS

With particular reference to the drawings and first to FIG. 1, a first form of the present fish line sinker comprises a body portion 10 having a projecting tab 12 on the bottom forward end thereof to which a pole line 14 can be connected. Connecting tab 12 has a series of apertures 16 throughout its length for selective connection to the pole line 14 and a hook line 15.

With reference to FIGS. 2, 3 and 4, the body portion 10 is channel-shaped in cross section, having a bottom wall 18 and outwardly flared wing portions 20. The junctures between the bottom wall 18 and wing portions 20 have gently rounded corners 22 on the exterior to eliminate edges that may catch on obstructions on the bottom of a body of water. The sinker has a pointed front end 24, and the wing portions 20 have a widened intermediate portion 20a and a rearwardly tapering portion which terminates at a rear blunt end 28. The over-all structure of the body portion assumes a streamlined configuration which will prevent it from snagging in most instances. The rearward end 28 of the body portion is angled toward the front from top to bottom, as designated by the numeral 30 in FIG. 3.

The forward end of the sinker, preferably the upper side of the body portion, has a hollow air-tight projection or bubble 34. The rearward end of the body portion has a lead weight 36 integrated therewith of sufficient mass and density to cause the sinker to submerge, namely, a mass and density sufficient to overcome any buoyancy of the body portion 10 and buoyancy of the projection 34. By means of such structure, the sinker will assume the position shown in FIG. 1 when it reaches the bottom of the body of water, namely, the mass 36 will cause the sinker to go to the bottom but the air-tight projection 34 will lift the front end to an upright position. The angled rear wall 28 induces the device to sit on the bottom of the body of water at a steep angle.

Thus, when the device reaches the bottom of the body of water, it will assume an upright position, and when a pull is imparted on the pole line, it will lift off the bottom in such upright position, as indicated by the arrow 42 in FIG. 1, to clear any obstructions on the bottom. The upwardly and outwardly curved wing portions 20 cause the sinker to move up at a steep angle to the horizontal in substantially the direction at which it is pointed when a pull is imparted on the line. That is, the resistance of the water against these wing portions causes the sinker to travel almost straight up, and such further reduces the possibility of snagging on the bottom. The farther to the rearward end that the pole line is secured in an aperture 16, the more tendency there is for the sinker to ascend at a steep angle.

If desired, a partial cover 38 can be secured on the top of the body portion adjacent to the rear and extending a short distance forwardly of the weight 36. This forms a pocket 40 which may be used to receive the baited hook, or loose bait if desired, when casting. Centrifugal force will hold the bait in the pocket when the sinker is being cast but the bait will float out of the pocket when the sinker submerges.

With reference to FIG. 5, a sinker embodiment is employed having a concept of operation similar to that of the first embodiment. In this structure, the body portion 10' comprises a plate slightly dished as viewed from the top, similar to the FIG. 1 embodiment. This body portion has a front air pocket 34', a rear weight 36', and a line connecting tab 12', and operates the same in the water as the FIG. 1 embodiment. This latter embodiment, however, has an upwardly projecting stabilizing fin 44 between the air pocket 34' and the weight 36' which stabilizes the device in the water to minimize wobbling. A pocket 40' is formed at the rear in front of the weight 36 to hold bait if desired when casting.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A fish line sinker comprising
a body portion having forward and rearward ends as well as top and bottom surfaces and opposite sides,
line connecting means on said body portion adjacent a forward portion thereof,
said body portion being channel-shaped and having side wing extensions which curve outwardly and upwardly to cause said body portion to move upwardly at a relatively steep angle when a pull is imparted to said body portion by a pole line,
weight means adjacent the rearward end of said body portion,
and buoyant means adjacent the forward end of said body portion,
said weight means being of a mass to overcome said buoyant means for submerging said sinker,
said weight and buoyant means cooperating to cause said body portion when submerged in water to position itself with the forward end upright whereby when a pull is imparted to the body portion by a pole line, the body portion in its initial movement and under the influence of said side wing extensions moves upwardly off the bottom in substantially the direction at which it is pointed to prevent snagging of the sinker on the bottom.

2. The fish line sinker of claim 1 wherein said line connecting means is on the bottom of said body portion and the rearward end of said body portion is tapered toward the front from top to bottom whereby said body portion when seated on said rearward end on the bottom of a body of water in a rest position tilts in the direction of said line connecting means.

3. The fish line sinker of claim 1 wherein said body portion is channel-shaped and includes a rear pocket adjacent said weight means which is open toward said forward end for receiving bait in a casting operation of the sinker.

* * * * *